(12) United States Patent
Sengoku et al.

(10) Patent No.: US 8,788,194 B2
(45) Date of Patent: Jul. 22, 2014

(54) NAVIGATION SERVER AND NAVIGATION SYSTEM

(75) Inventors: Koji Sengoku, Tokyo (JP); Yuichiro Ishido, Tokyo (JP); Tadafumi Nogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 13/579,352

(22) PCT Filed: Oct. 15, 2010

(86) PCT No.: PCT/JP2010/068189
§ 371 (c)(1),
(2), (4) Date: Aug. 16, 2012

(87) PCT Pub. No.: WO2011/104925
PCT Pub. Date: Sep. 1, 2011

(65) Prior Publication Data
US 2012/0310525 A1 Dec. 6, 2012

(30) Foreign Application Priority Data
Feb. 23, 2010 (JP) ................................ 2010-037352

(51) Int. Cl.
*G01C 21/34* (2006.01)
*G01C 21/36* (2006.01)
*G08G 1/01* (2006.01)
*G08G 1/0967* (2006.01)
*G08G 1/0968* (2006.01)

(52) U.S. Cl.
CPC ........ *G01C 21/3453* (2013.01); *G01C 21/3415* (2013.01); *G01C 21/3469* (2013.01); *G01C 21/3492* (2013.01); *G01C 21/3697* (2013.01); *G08G 1/0137* (2013.01); *G08G 1/096775* (2013.01); *G08G 1/096833* (2013.01); *G08G 1/096844* (2013.01)
USPC ............................ 701/423; 701/414; 701/416

(58) Field of Classification Search
CPC .............. G01C 21/34; G01C 21/3407; G01C 21/3415; G01C 21/3446; G01C 21/3453; G01C 21/3454; G01C 21/3461; G01C 21/3469; G01C 21/3476; G01C 21/3484; G01C 21/3492; G01C 21/3691; G01C 21/3694; G01C 21/3697; G08G 1/0104; G08G 1/0125; G08G 1/0133; G08G 1/0137; G08G 1/0967; G08G 1/096833; G08G 1/096838; G08G 1/096844; G08G 1/096888; G08G 1/096775; G08G 99/00
USPC .......... 701/423, 533, 430, 414, 425, 123, 416
See application file for complete search history.

(56) References Cited

U.S. PATENT DOCUMENTS 5,406,490 A   4/1995   Braegas
6,163,751 A   12/2000  Van Roekel
(Continued)

FOREIGN PATENT DOCUMENTS

CN    1487266     4/2004
CN    101097155   1/2008
(Continued)

OTHER PUBLICATIONS

Chinese Office Action dated Mar. 27, 2013, 12 pages.
European Search Report dated Oct. 22, 2013, 10 pages.

*Primary Examiner* — Jerrah Edwards
(74) *Attorney, Agent, or Firm* — Rankin, Hill & Clark LLP

(57) ABSTRACT

Disclosed is a navigation system which creates "environment contribution information" in accordance with a deviation ($\delta(k)$) between the total cost ($C1(k)$) of a first route ($RT1(k)$) which is searched by using a traffic information indicating the amount of cost required to pass through each link and the total cost ($C2(k)$) of a second route ($RT2(k)$) which is searched without using the traffic information. The traffic information used in searching the first route ($RT1(k)$) to a target position ($TP(k)$) of a vehicle (2) is used in searching a route to a shared target position by a navigation device (200).

2 Claims, 4 Drawing Sheets

(56) References Cited

U.S. PATENT DOCUMENTS

| | | | |
|---|---|---|---|
| 6,405,130 B1* | 6/2002 | Piwowarski | 701/411 |
| 6,421,606 B1* | 7/2002 | Asai et al. | 701/410 |
| 8,255,151 B2* | 8/2012 | Bourque et al. | 701/400 |
| 2004/0104842 A1* | 6/2004 | Drury et al. | 342/357.13 |
| 2009/0082952 A1 | 3/2009 | Narita et al. | |
| 2009/0287408 A1 | 11/2009 | Gerdes et al. | |
| 2010/0324817 A1* | 12/2010 | Hansen et al. | 701/210 |

FOREIGN PATENT DOCUMENTS

| | | |
|---|---|---|
| CN | 101441817 | 5/2009 |
| JP | 06-044491 | 2/1994 |
| JP | 2002-303523 | 10/2002 |
| JP | 2002-318124 | 10/2002 |
| JP | 2003-194562 | 7/2003 |
| JP | 2003-195743 | 7/2003 |
| JP | 4169650 | 8/2008 |

* cited by examiner

NAVIGATION SERVER AND NAVIGATION SYSTEM

TECHNICAL FIELD

The present invention relates to a technique which manages information related to a consumption amount of fuels of a vehicle according to communications with a navigation device mounted in the vehicle.

BACKGROUND ART

From the viewpoint of reducing the emission amount of greenhouse gas such as $CO_2$ or the like from a vehicle, there has been disclosed a technical approach to search a route with consideration on environment. According to the approach, for example, if the deviation between a measured value of the emission amount of the greenhouse gas of the vehicle accumulated from a departure position to the present position and an estimated value thereof is equal to or greater than a threshold value, the route is re-searched (refer to Japanese Patent No. 4169650).

SUMMARY OF INVENTION

Technical Problem

However, the relevance between a basic information used in searching the route and an environment improvement effect such as the reduction effect on the emission amount of the greenhouse gas from the vehicle is unclear to the user of the vehicle. Therefore, the value of the information may be evaluated by the user of the vehicle inappropriately.

It is therefore an object of the present invention to provide a system and the like capable of notifying the user of a vehicle the relevance between an information used in searching a route of the vehicle and the environment improvement effect.

Solution to the Problem

To attain an object described above, the present invention provides a navigation server comprising: a first database configured to store an traffic information which indicates the amount of cost required to pass through each link serving as a constituent element of a road and is used in searching a route by a navigation device mounted in a vehicle; a first support arithmetic processing element configured to recognize a route searched by using the traffic information stored in the first database to join a present position and a target position of the vehicle as a first route according to communications with the navigation device, and recognize a route searched without using the traffic information stored in the first database to join the present position and the target position of the vehicle as a second route according to communications with the navigation device; a second support arithmetic processing element configured to create an environment contribution information indicating a reduction effect of the cost on the basis of a deviation between the total cost of the first route recognized by the first support arithmetic processing element and the total cost of the second route recognized by the first support arithmetic processing element; and a second database configured to store the environment contribution information created by the second support arithmetic processing element in a state accessible via a network.

According to the navigation server of the present invention, the environment contribution information is created according to the deviation between the total cost of the first route which is searched by using the traffic information indicating the amount of cost required to pass through each link and the total cost of the second route which is searched without using the traffic information. The environment contribution information is stored in a form accessible via a network.

The cost is referred to as any parameter such as a time, a distance, fuels, an emission amount of greenhouse gas or the like whose increment exerts an adverse effect on the environment. The environment contribution information may be created separately for each individual vehicle or may be created collectively for a plurality of vehicles. The subject for searching the first route may be the navigation server or may be the navigation device. The subject for searching the second route may be the navigation server or may be the navigation device.

Meanwhile, the traffic information used in searching the first route to the target position of the vehicle is used in searching a route to a shared target position by the navigation device. Therefore, the user of the vehicle can benefit from the traffic information when the vehicle is induced or guided to the target position according to the route searched by the navigation device.

Thereby, it is possible to notify one user or users of plural vehicles the relevance between the traffic information used in searching a route of the vehicle by the navigation device and the environment improvement effect indicated by the environment contribution information, and consequently the benefits of the traffic information related to the environment improvement.

It is acceptable that the first support arithmetic processing element is configured to determine whether the target position of the vehicle is altered or not according to communications with the navigation device and recognize a new first route and a new second route to join the present position and the altered target position of the vehicle if it is determined that the target position of the vehicle is altered, and the second support arithmetic processing element is configured to create the environment contribution information on the basis of the deviation between the total cost of the new first route recognized by the first support arithmetic processing element and the total cost of the new second route recognized by the first support arithmetic processing element.

According to the navigation server having the above-mentioned configuration, when the target position of the vehicle is altered, it is possible for the user of the vehicle to recognize the benefits related to the environment improvement of the traffic information used by the navigation device in searching a new route to the altered target position.

It is acceptable that the second support arithmetic processing element is configured to create the environment contribution information on the basis of the deviation between the total cost of the new first route and the total cost of the new second route, and on the basis of a portion which is included in the deviation between the total cost of the previous first route and the total cost of the previous second route to the unaltered target position of the vehicle and which is determined according to a travel distance of the vehicle until the target position is altered.

According to the navigation server having the above-mentioned configuration, when the target position of the vehicle is altered, it is possible for the user of the vehicle to recognize the benefits related to the environment improvement of the traffic information used by the navigation device in searching not only the new route to the altered target position but also the previous route to the unaltered target position.

To attain an object described above, the present invention provides a navigation system comprising the navigation server and a navigation device mounted in a vehicle. The navigation device includes a first arithmetic processing element configured to recognize the present position and the target position of the vehicle and send them to the navigation server and a second arithmetic processing element configured to recognize the traffic information according to communications with the navigation server and search a route from the present position to the target position of the vehicle on the basis of the traffic information.

According to the navigation system of the present invention, it is possible to notify one user or users of plural vehicles the relevance between the traffic information used in searching a route of the vehicle by the navigation device and the environment improvement effect indicated by the environment contribution information, and consequently the benefits of the traffic information related to the environment improvement.

DESCRIPTION OF EMBODIMENTS

Configuration of a Navigation System of the Present Invention

The configuration of the navigation system as an embodiment of the present invention is described.

Figure 1:
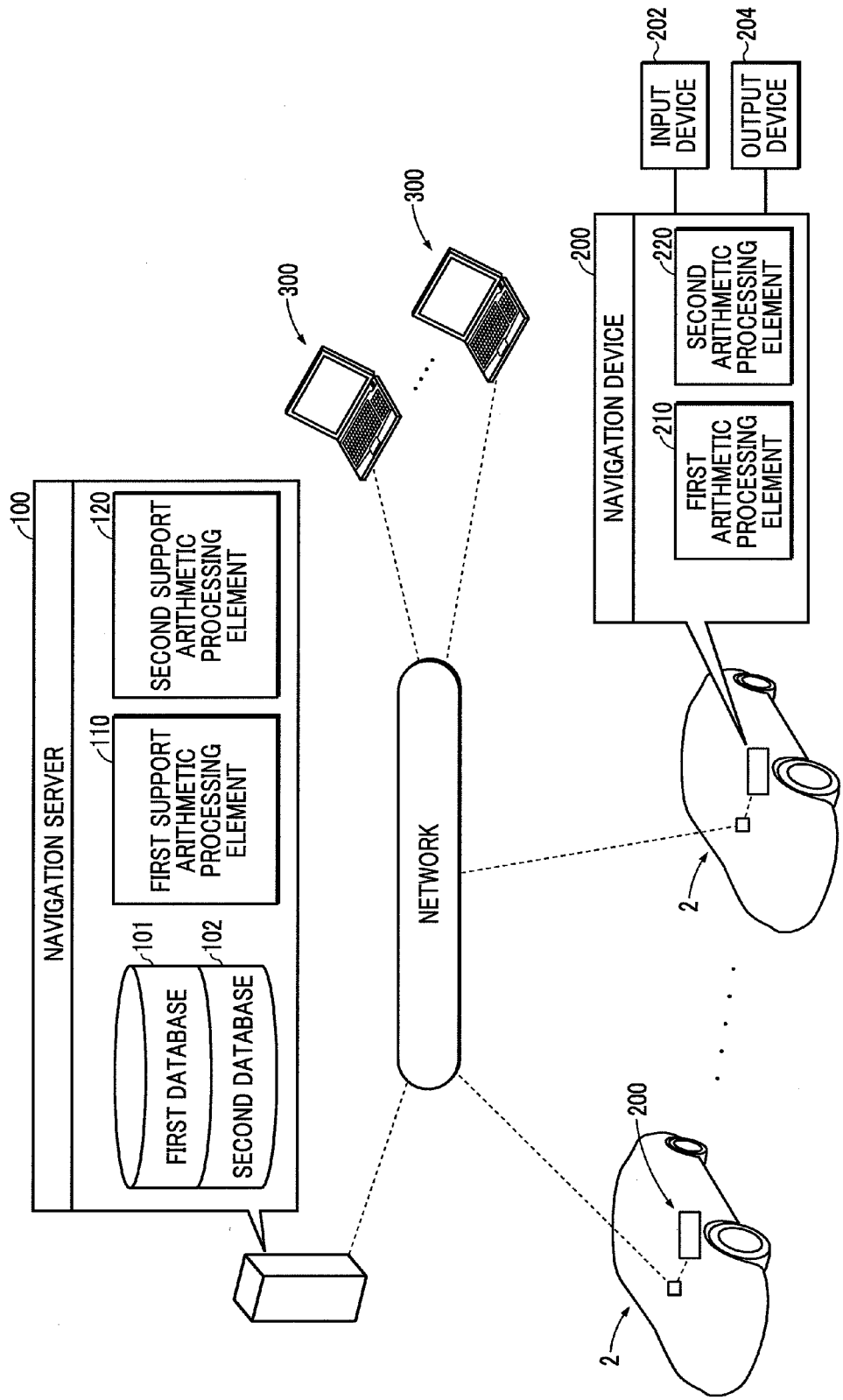
FIG. 1 is an explanatory diagram illustrating a configuration of a navigation system of the present invention.

The navigation system illustrated in FIG. 1 is configured to have a navigation server 100 and a navigation device 200 mounted in an automotive vehicle 2. It is acceptable that a part of or the entire part of the navigation device 200 is constituted from a portable apparatus which may be detached from the vehicle 2.

The navigation server 100 has communication functions to the navigation device 200 and other information processing terminal devices 300 respectively via network, and is composed of a single or plural server computers. As the communication network, an internet, a phone-line network or a communication network using satellite broadcast may be used. The information processing terminal device 300 may be a portable terminal device or a computer different from the navigation device 200 or may be the navigation device 200 itself.

The navigation server 100 is provided with a first database 101, a second database 102, a first support arithmetic processing element 110, and a second support arithmetic processing element 120.

The first database and the second database is composed of a storing device such as a memory, a HDD, an SSD or the like.

The first database 101 stores a "map information" which indicates the alignments of roads and a "traffic information" which indicates the amount of cost required to pass through each link serving as a constituent element of a road and is used in searching a route by the navigation device 200 mounted in the vehicle 2.

The second database 102 stores an "environment contribution information" in a state accessible from the navigation device 200 or the terminal device 300 via network.

Each of the first support arithmetic processing element 110 and the second support arithmetic processing element 120 is composed of a processor and a memory serving as the hardware resources of a computer. It is acceptable that the first support arithmetic processing element 110 and the second support arithmetic processing element 120 share common hardware resources partially or completely, it is also acceptable that they are made of completely different hardware resources. Each element being configured to perform an arithmetic computation process means that the processor reads out a relevant program (software) from the memory and executes the program to perform the arithmetic computation process.

The first support arithmetic processing element 110 is configured to recognize a route searched by using the traffic information stored in the first database 101 to join a present position and a target position of the vehicle 2 as a first route according to communications with the navigation device 200. The first support arithmetic processing element 110 is configured to recognize a route searched without using the traffic information to join the present position and the target position of the vehicle 2 as a second route according to communications with the navigation device 200.

The second support arithmetic processing element 120 is configured to create the environment contribution information indicating a reduction effect of the cost on the basis of a deviation between the total cost of the first route and the total cost of the second route.

The navigation device 200 is configured to include an input device 202, an output device 204, a first arithmetic processing element 210 and a second arithmetic processing element 220. The input device 202 is made up of a voice recognition device recognizing a voice command from a user, a button or a dial operated by the user via fingers or hands, or the like. The output device 204 is made up of a display device disposed in a center console or the like of the vehicle 2.

The first arithmetic processing element 210 is configured to recognize the present position and the target position of the vehicle 2 and send them to the navigation server 100. The present position of the vehicle 2 may be determined by using GPS or may be determined by using an acceleration sensor which outputs signals in accordance with the acceleration of the vehicle 2 if necessary. The position may be denoted by latitude and longitude (two dimensional coordinate values) or may be denoted by latitude, longitude and magnitude (three dimensional coordinate values).

The second arithmetic processing element 220 is configured to recognize the traffic information according to communications with the navigation server 100 and search a route from the present position to the target position of the vehicle 2 by using the traffic information.

Functions of the Navigation System of the Present Invention

Functions of the navigation system of the present invention will be described.

Figure 2:
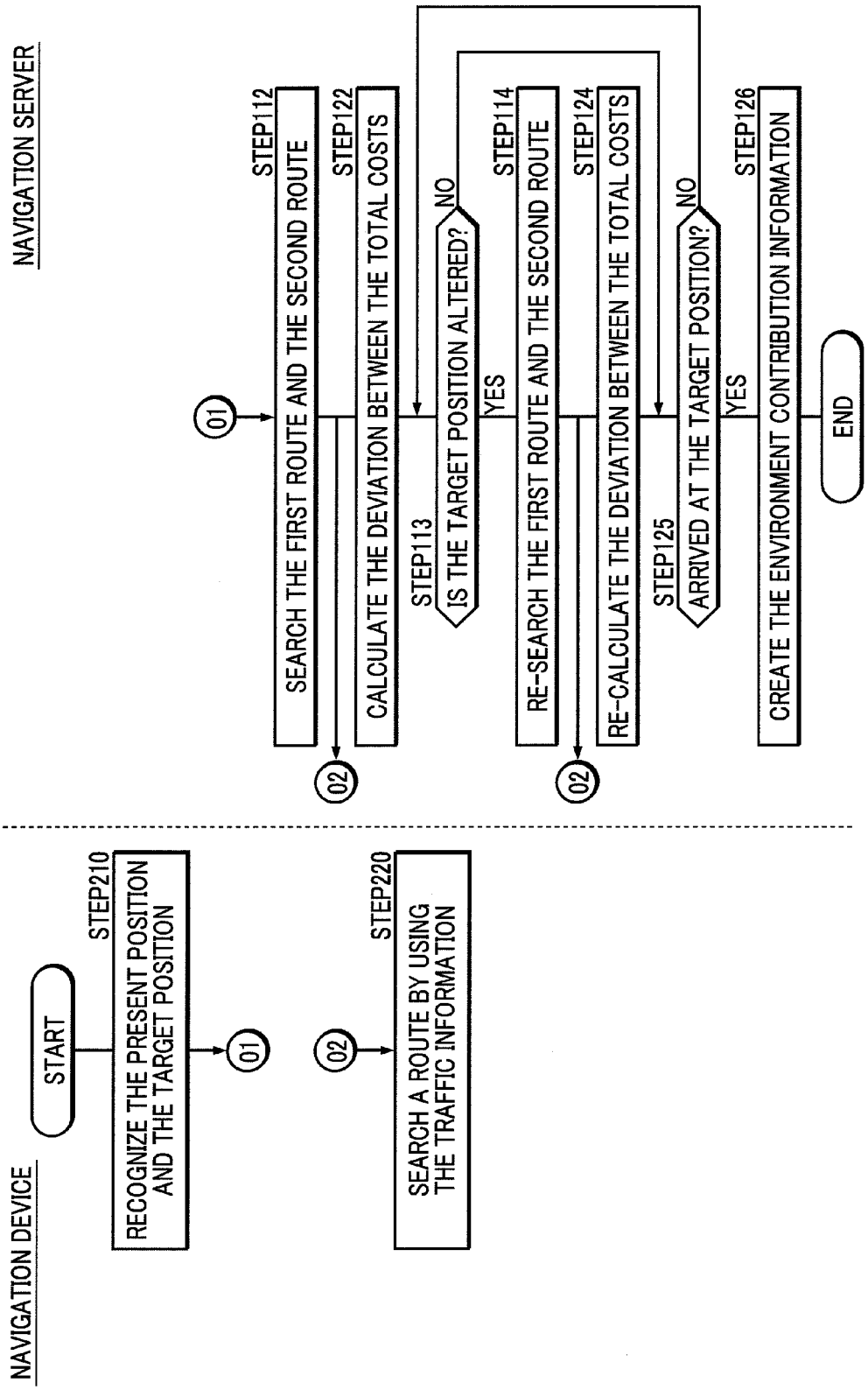
FIG. 2 is a functional explanatory diagram of the navigation system of the present invention.

In the navigation device 200, the first arithmetic processing element 210 recognizes the target position TP(k) (k denotes the number of times where the target position is set or altered) input by the user via the input device 202 and the present position PP(k) of the vehicle 2 measured by using GPS or the like at the current time (FIG. 2/STEP 210). Thereafter, the first arithmetic processing element 210 sends the present position PP(k) and the target position TP(k), together with a vehicular identifier for identifying the vehicle 2, to the navigation server 100 via network by using a wireless communication apparatus.

In response, the following procedure is performed in the navigation server 100 for each vehicle 2 identified by the vehicular identifier. The first support arithmetic processing element 110 recognizes the present position PP(k) and the target position TP(k) of the vehicle 2 and then searches two routes joining the present position PP(k) and the target position TP(k) (FIG. 2/STEP 112).

Figure 3:
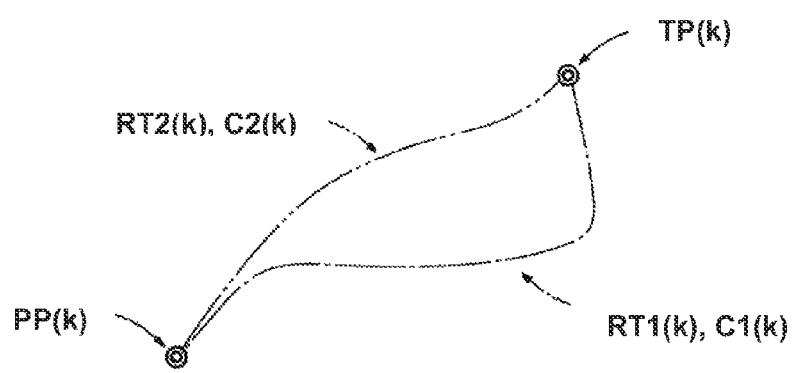
FIGS. 3(a) and 3(b) are explanatory diagrams illustrating a first route, a second route and a total cost of each route.
Figure 3:
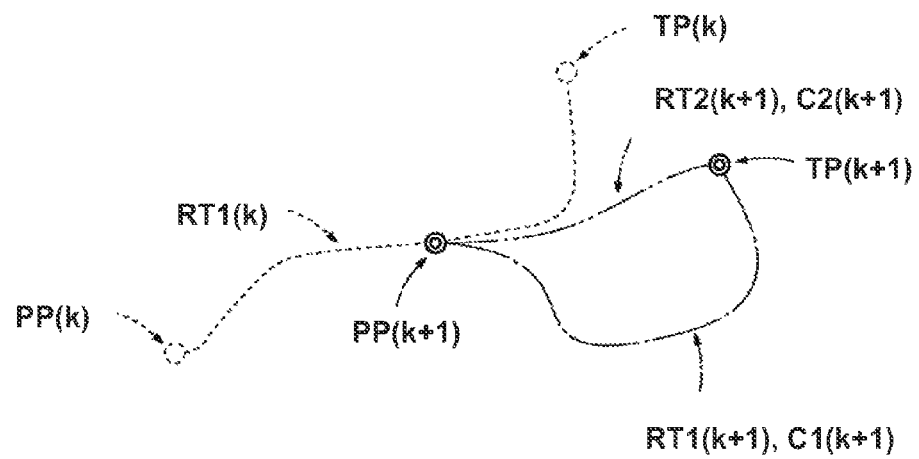

Thereby, by using the map information and the traffic information, the first route RT1(k) composed of a link group $\{L_{i1(k)}\}$ illustrated by a chain line in FIG. 3(a) is searched out. By using the map information but without using the traffic information, the second route RT2(k) composed of a link group $\{L_{i2(k)}\}$ illustrated by a two-dot chain line in FIG. 3(a) is searched out.

As aforementioned, the traffic information denotes the cost $c_j$ for each link $L_j$. The cost is referred to as one parameter or plural parameters such as a time required by the vehicle 2 to pass through a link, a travel distance, a fuel consumption amount, or an emission amount of greenhouse gas such as $CO_2$ or the like whose increment of it's value is highly probable to exert an adverse effect on the environment.

Thereby, the first route RT1(k) is searched by considering the effects of the travel of the vehicle 2 on the environment; meanwhile, the second route RT2(k) is searched without considering the effects. Thus, the first route RT1(k) is searched as a route whose total cost is minimum or approximately minimum among a plurality of searchable routes. Moreover, the total cost of the first route RT1(k) is smaller than the total cost of the second route RT2(k).

The traffic information is sent by the first support arithmetic processing element 110 from the navigation server 100 to the navigation device 200. In response, in the navigation device 200, the second arithmetic processing element 220 searches a route to join the present position and the target position at the minimum total cost by using the traffic information (FIG. 2/STEP 220). It is acceptable that data indicating the route calculated by the navigation server 100 on the basis of the traffic information is sent to the navigation device 200 and the navigation device 200 uses the route without modifications as the searched route or searches a new route on the basis of the route.

In the navigation server 100, the second support arithmetic processing element 120 calculates the deviation $\delta(k)=C2(k)-C1(k)$ between the total cost $C1(k)=\Sigma_{i1(k)}c_{i1(k)}$ of the first route RT1(k) and the total cost $C2(k)=\Sigma_{i2(k)}c_{i2(k)}$ of the second route RT2(k) (FIG. 2/STEP 122).

The first support arithmetic processing element 110, on the basis of the result of communications with the navigation device 200, determines whether the target position is altered or not (FIG. 2/STEP 113). If it is determined that the target position of the vehicle 2 is not altered (FIG. 2/STEP 113 . . . NO), whether or not the vehicle 2 has arrived at the target position is determined by the second support arithmetic processing element 120 (FIG. 2/STEP 125).

On the other hand, if it is determined that the target position of the vehicle 2 is altered (FIG. 2/STEP 113 . . . YES), the first support arithmetic processing element 110 re-searches two routes joining the new target position TP(k+1) and the present position PP(k+1) of the vehicle 2 at the time where the previous target position TP(k) is altered to the new target position TP(k+1) (FIG. 2/STEP 114).

Thereby, by using the map information and the traffic information, the new first route RT1(k+1) composed of a link group $\{L_{i1(k+1)}\}$ illustrated by a chain line in FIG. 3(b) is searched out. By using the map information but without using the traffic information, the second route RT2(k+1) composed of a link group $\{L_{i2(k+1)}\}$ illustrated by a two-dot chain line in FIG. 3(b) is searched out.

The traffic information is sent by the first support arithmetic processing element 110 from the navigation server 100 to the navigation device 200. In response, in the navigation device 200, the second arithmetic processing element 220 searches a route to join the present position and the new target position at the minimum total cost by using the traffic information (FIG. 2/STEP 220).

The second support arithmetic processing element 120 re-calculates the current deviation of the total costs (FIG. 2/STEP 122). Thus, the deviation $C2(k+1)-C1(k+1)$ between the total cost $C1(k+1)=\Sigma_{i1(k+1)}c_{i1(k+1)}$ of the new first route RT1(k+1) and the total cost $C2(k+1)$ $(=\Sigma_{i2(k+1)}c_{i2(k+1)}$ of the new second route RT2(k+1) is calculated as the new total cost deviation $\delta(k+1)$.

It is acceptable to add a product of the previous deviation $\delta(k)$ by a coefficient $\gamma(k)$ $(0<\gamma(k)<1)$ to the new total cost deviation $\delta(k+1)$. The coefficient $\gamma(k)$ may be calculated, for example, as a ratio of a measured value of the cost from the previous present position PP(k) to the current present position PP(k+1) of the vehicle 2 (for example, the measured value of the travel distance) to the total cost $C1(k)$ (for example the route length) of the previous first route RT1(k).

Thereafter, the second support arithmetic processing element 120 determines whether the vehicle 2 has arrived at the target position or not according to whether or not the present position of the vehicle 2 is in a predefined distance range of the target position (FIG. 2/STEP 125). If it is determined that the vehicle 2 has not arrived at the target position (FIG. 2/STEP 125 . . . NO), the procedure subsequent to the determination whether the target position (refer to FIG. 2/STEP 113) is altered or not is repeated.

On the other hand, if it is determined that the vehicle 2 has arrived at the target position (FIG. 2/STEP 125 . . . YES), the second support arithmetic processing element 120 creates the "environment contribution information" indicating the reduction effect on the cost of the vehicle 2 on the basis of the newest total cost deviation or the accumulative value thereof (FIG. 2/STEP 126).

Figure 4:
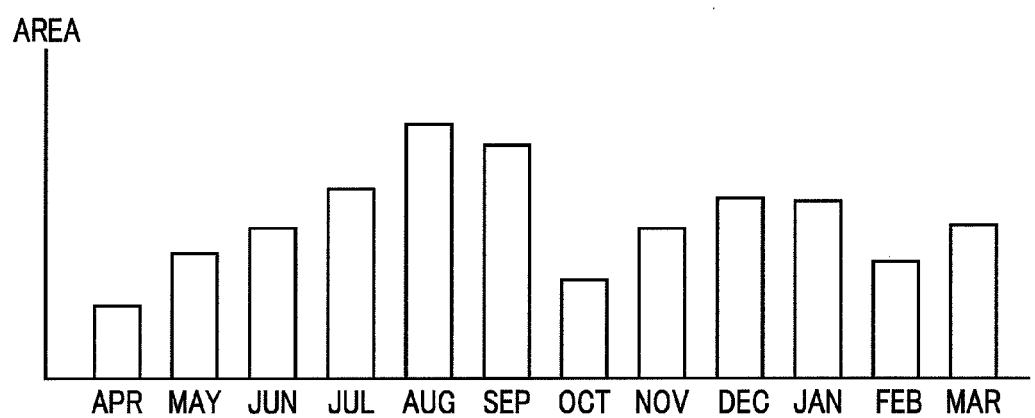
FIG. 4 is an explanatory diagram related to environment contribution information.

For example, as illustrated in FIG. 4, the environment contribution information in which the $CO_2$ reduction amount serving as the accumulative value of the total cost over a predefined period (for example, one year), the number of beech trees and the forest area deduced from the $CO_2$ reduction amount according to a predefined conversion method are denoted by numerical values, is created. Further, a graph indicating the transition of the $CO_2$ reduction amount in the predefined period or the converted amount thereof per unit period (for example, one month) is included in the environment contribution information. Furthermore, the traffic information acquisition number (refer to FIG. 2/arrow 02), the accumulative travel distance and the travel distance with route guidance of the vehicle 2 are also included in the environment contribution information.

In addition to that the cost is indicated by the $CO_2$ emission amount and the total cost deviation and consequently the environment improvement effect is indicated by the $CO_2$ reduction amount, it is acceptable that the cost is indicated by the travel distance, the travel time, the fuel consumption amount or the like of the vehicle 2 and the total cost deviation is indicated by a reduction amount on the travel distance, the travel time or the fuel consumption amount of the vehicle 2.

In addition to creating the environment contribution information separately for each individual vehicle 2, it is also acceptable that the environment contribution information is created collectively for a plurality of vehicles 2 (for example, a group of vehicles common in area attributes).

The environment contribution information is stored in the second database 102 in association with the vehicular identifier, the user can view the environment contribution information via network by inputting the vehicular identifier into the terminal device 300.

Effects of the Navigation System of the Present Invention

According to the navigation system of the present invention and the navigation server 100 and the navigation device 200 which are the components thereof, the "environment contribution information" is created according to the deviation $\delta(k)$ between the total cost $C1(k)$ of the first route $RT1(k)$ which is searched by using the traffic information indicating the amount of cost required to pass through each link and the total cost $C2(k)$ of the second route $RT2(k)$ which is searched without using the traffic information (FIG. 2/STEP 126 and FIG. 4).

Meanwhile, the traffic information used in searching the first route $RT1(k)$ to the target position $TP(k)$ of the vehicle 2 is used in searching a route to a shared target position by the navigation device 200 (refer to FIG. 2/STEP 220). Therefore, the user of the vehicle 2 can benefit from the traffic information when the vehicle is induced or guided to the target position according to the route searched by the navigation device 200. It is also applicable in the case where the target position of the vehicle 2 is altered.

Thereby, it is possible to notify one user or users of plural vehicles 2 the relevance between the traffic information used in searching a route of the vehicle 2 by the navigation device 200 and the environment improvement effect indicated by the environment contribution information, and consequently the benefits of the traffic information related to the environment improvement.

In the case where the product of the previous deviation $\delta(k)$ by a coefficient $\gamma(k)$ $(0<\gamma(k)<1)$ is added to the new total cost deviation $\delta(k+1)$, when the previous target position $TP(k)$ of the vehicle 2 is altered to the new target position $TP(k+1)$, it is possible for the user of the vehicle 2 to recognize the benefits related to the environment improvement of the traffic information used by the navigation device 200 in searching not only the new route to the altered target position $TP(k+1)$ but also the previous route to the unaltered target position.

The invention claimed is:

1. A navigation server comprising:
a first database configured to store a map information which indicates alignments of roads and a traffic information which indicates an amount of cost required to pass through each link serving as a constituent element of the roads and is used in searching a route by a navigation device mounted in a vehicle;
a first support arithmetic processing element configured to recognize a route searched by using the traffic information stored in the first database to join a present position and a target position of the vehicle as a first route according to communications with the navigation device, and recognize a route searched by using the map information but without using the traffic information stored in the first database to join the present position and the target position of the vehicle as a second route according to communications with the navigation device;
a second support arithmetic processing element configured to create an environment contribution information indicating a reduction effect of the cost on the basis of a deviation between a total cost of the first route recognized by the first support arithmetic processing element and a total cost of the second route recognized by the first support arithmetic processing element; and
a second database configured to store the environment contribution information created by the second support arithmetic processing element in a state accessible via a network,
wherein the first support arithmetic processing element is configured to determine, before the vehicle has arrived at the target position ahead, whether the target position of the vehicle is altered or not according to communications with the navigation device and recognize a new first route and a new second route to join a present position and an altered target position of the vehicle in a case where it is determined that the target position of the vehicle is altered, and
the second support arithmetic processing element is configured to create the environment contribution information on the basis of a deviation between a total cost of the new first route and a total cost of the new second route, and on the basis of the previously calculated deviation between the total cost of the previous first route and the total cost of the previous second route to the unaltered target position of the vehicle and which is determined according to a travel distance of the vehicle until the target position is altered.

2. A navigation system comprising a navigation server according to claim 1 and a navigation device mounted in a vehicle,
the navigation device including
a first arithmetic processing element configured to recognize a present position and a target position of the vehicle and send them to the navigation server; and
a second arithmetic processing element configured to recognize the traffic information stored in the first database according to communications with the navigation server and search a route from the present position to the target position of the vehicle by using the traffic information.

* * * * *